Figure 1:
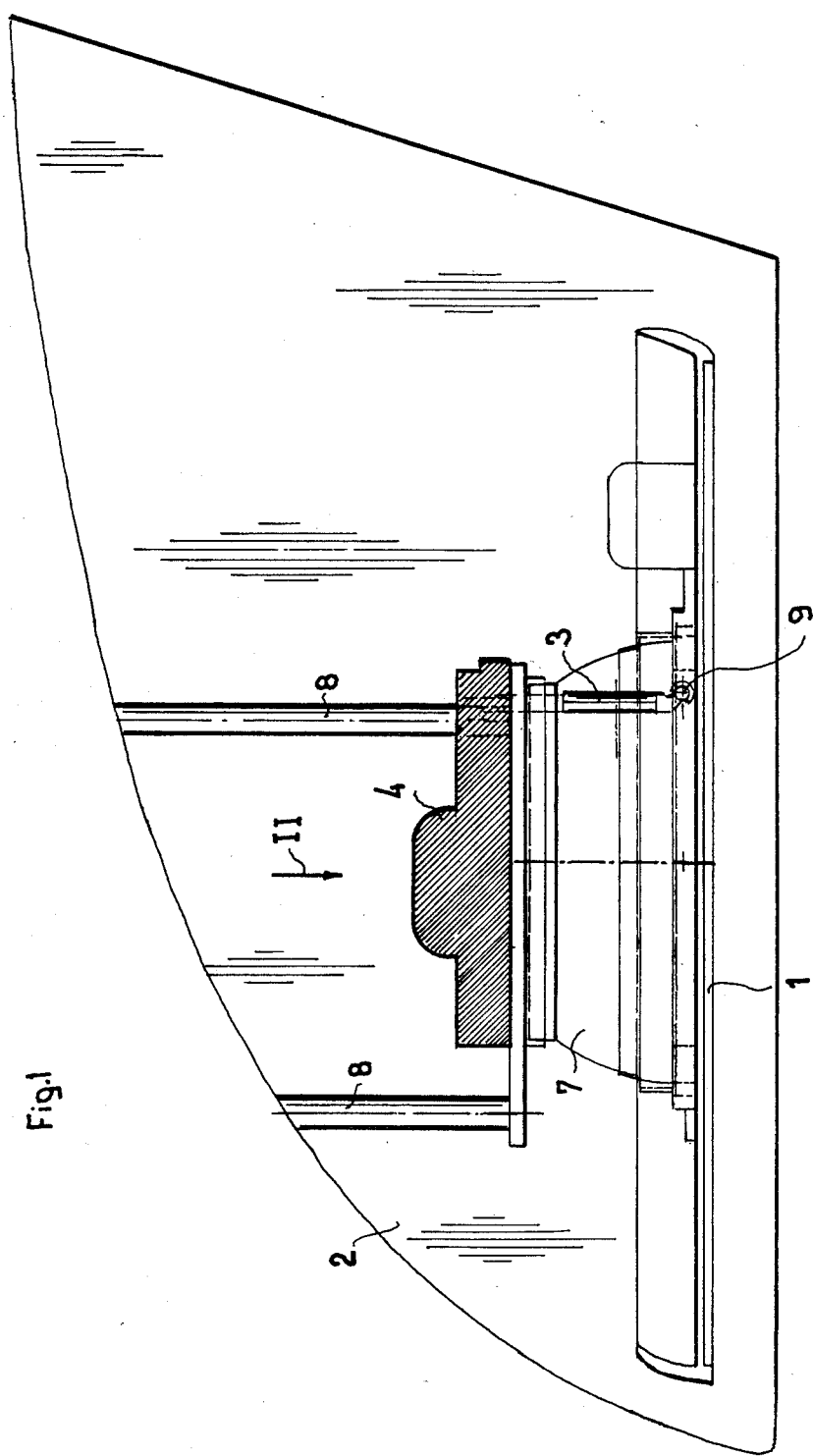

United States Patent [19]

Janowicz

[11] Patent Number: 4,955,703

[45] Date of Patent: Sep. 11, 1990

[54] DEVICE FOR AN OUTSIDE MIRROR FOR MOTOR VEHICLES

[76] Inventor: Miroslaw Janowicz, Feurigstrasse 46, D-1000 Berlin 62, Fed. Rep. of Germany

[21] Appl. No.: 312,631

[22] Filed: Feb. 17, 1989

[30] Foreign Application Priority Data

Feb. 18, 1988 [DE] Fed. Rep. of Germany ....... 3805371

[51] Int. Cl.$^5$ .............................................. B60R 1/06
[52] U.S. Cl. ..................................... 350/637; 248/479
[58] Field of Search ....................... 350/631, 632, 637; 248/479, 480, 485, 486, 487

[56] References Cited

U.S. PATENT DOCUMENTS

| | | | |
|---|---|---|---|
| 3,199,075 | 8/1965 | Simmons | 350/605 |
| 3,799,658 | 3/1974 | Pignatelli | 350/637 |
| 4,105,301 | 8/1978 | Doeg | 350/637 |
| 4,318,590 | 3/1982 | Hanley | 350/637 |
| 4,728,180 | 3/1988 | Janowicz | 350/637 |
| 4,834,522 | 5/1989 | Janowicz | 350/637 |

Primary Examiner—Bruce Y. Arnold
Assistant Examiner—J. P. Ryan
Attorney, Agent, or Firm—Krass & Young

[57] ABSTRACT

This invention relates to a device for an outside mirror for motor vehicles which is electrically slowly shiftable around a vertical axis for adjustment purposes and rapidly shiftable temporarily by a switch to check the blind spot. A supplemental device comprises first element which, when said switch is actuated, oscillates between two limit points whereby at the actuation of said switch a synchronous and fast shifting of the mirror around the vertical axis is effected, and a second element running synchronously with the slow shifting of the mirror around the vertical axis for adjusting the mirror to the distance of the driver's eyes fixes the two limit points for the fast shifting of the mirror. According to the invnetion the supplemental device (without said switch) is situated directly behind the mirror. A third element extends into the supplemental device establishing a direct mechanical connection between the mirror and the first and second element. Thus a very compact and secure device is formed.

16 Claims, 11 Drawing Sheets

DEVICE FOR AN OUTSIDE MIRROR FOR MOTOR VEHICLES

The invention relates to a device for an outside mirror for motor vehicles.

Such a device is known from German Offenlegungsschrift No. 27 15 575. The latter does not allow a simultaneous fast swivelling of the mirror around the vertical axis for registering the blind spot.

This task is realized according to the invention. Due to the fact that the supplemental device is placed directly behind the mirror, preferably in the mirror housing, a simple and compact solution is provided. Additionally, by this construction an immediate mechanical connection mirror and the elements in the supplemental device is provided which improves the precision of the regulation also after many and frequent operations.

Figure 2:
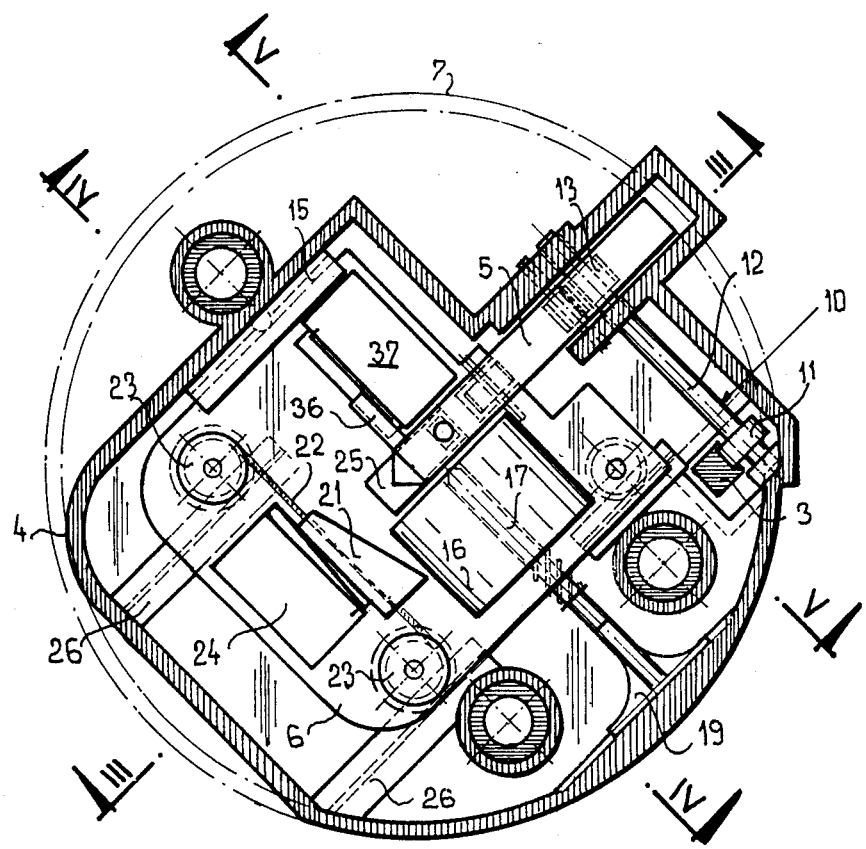
Figure 3:
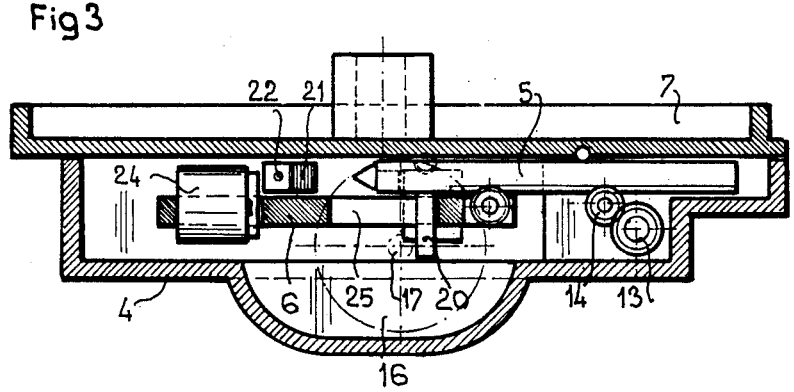
Figure 4:
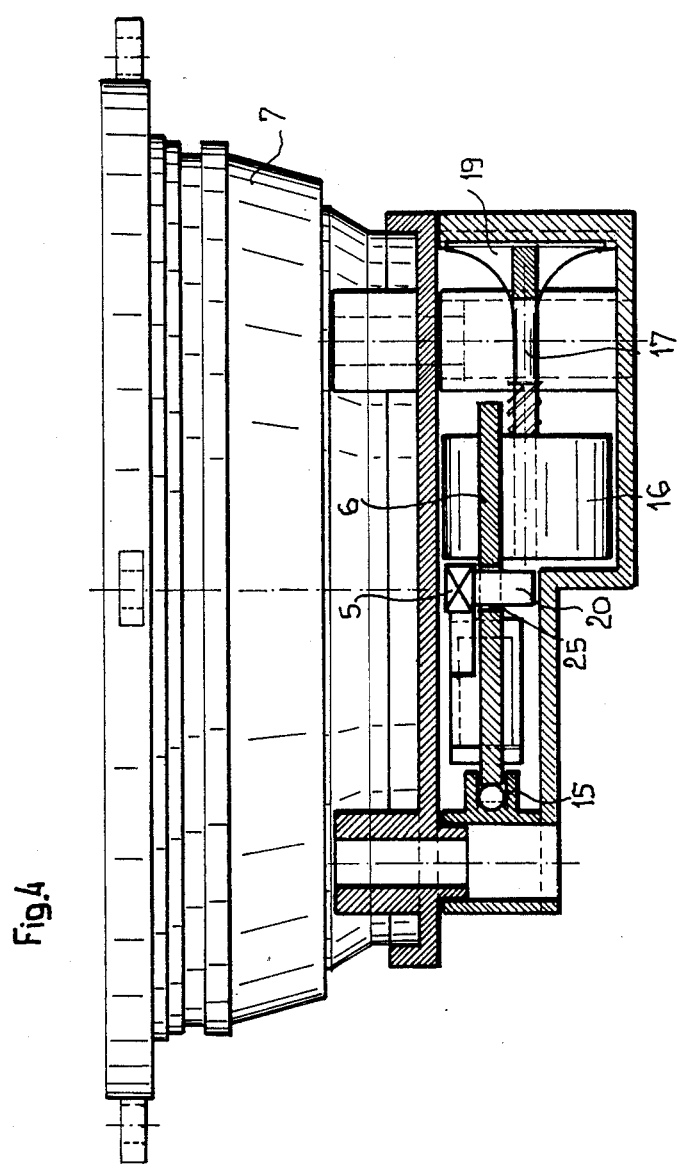
Figure 5:
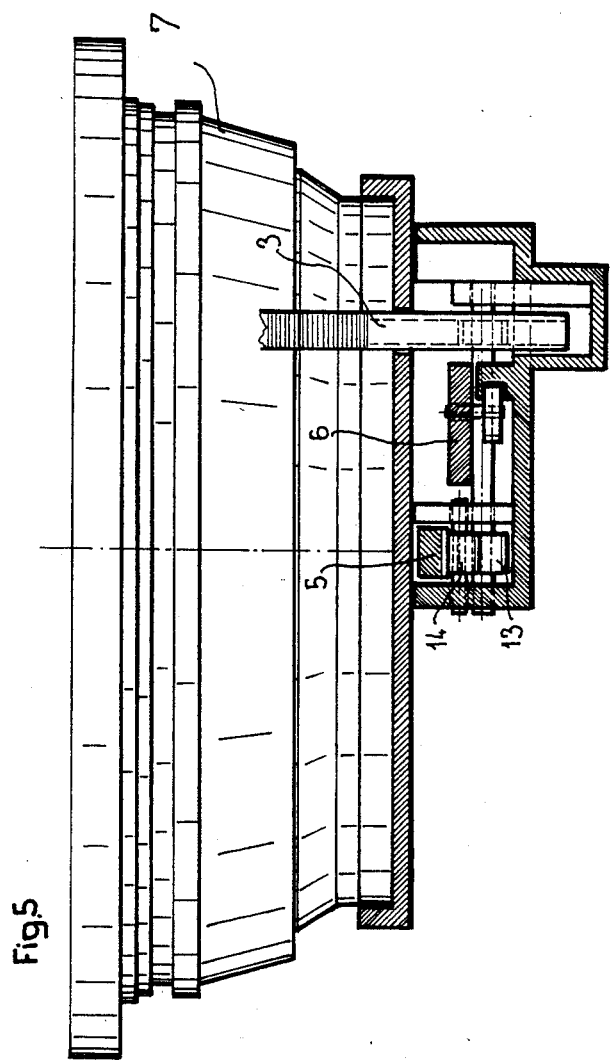
Figure 6:
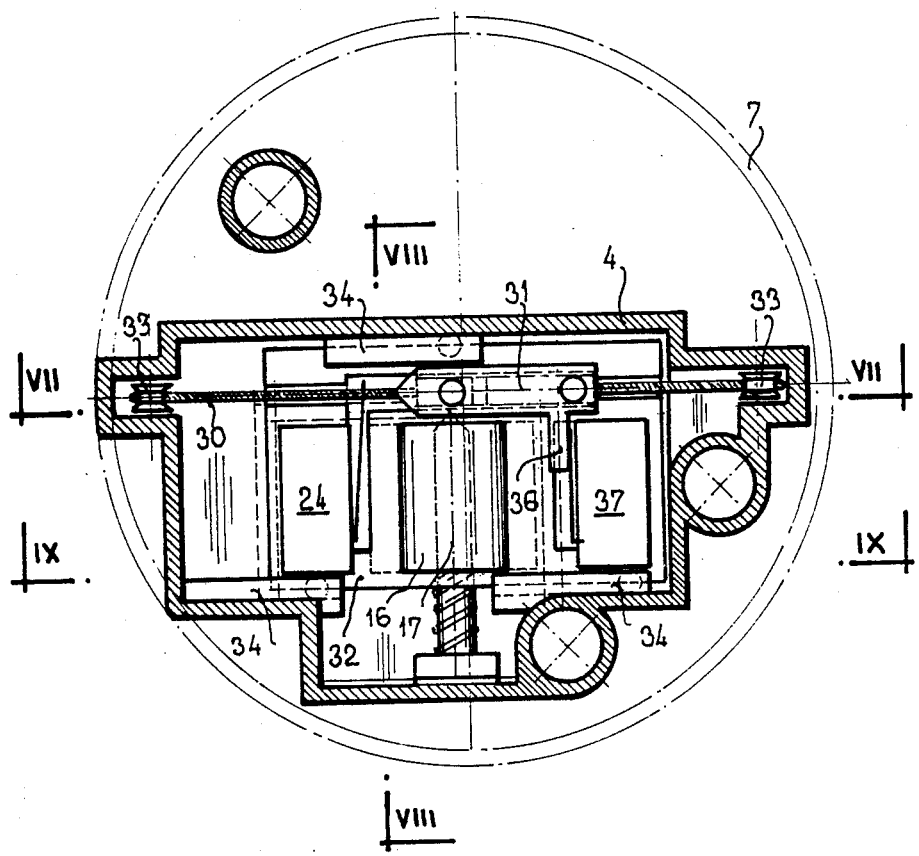
Figure 7:
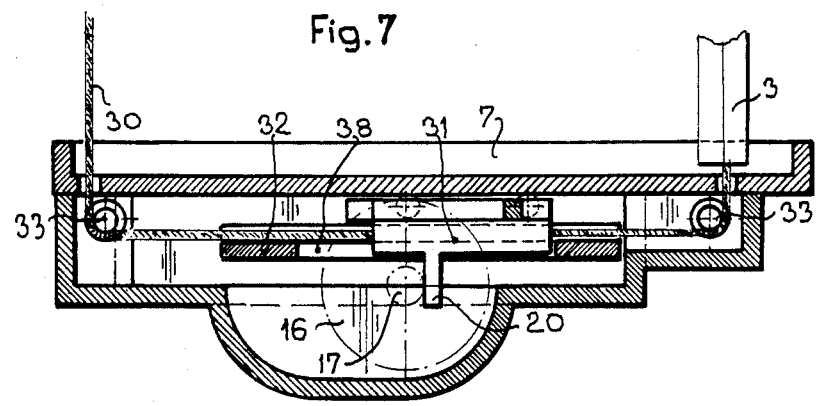
Figure 8:
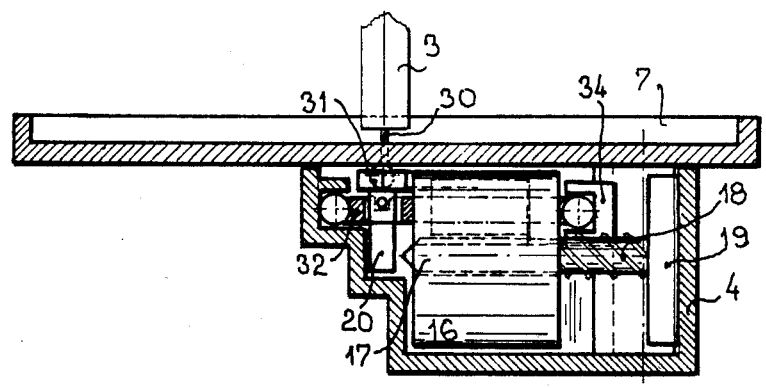
Figure 9:
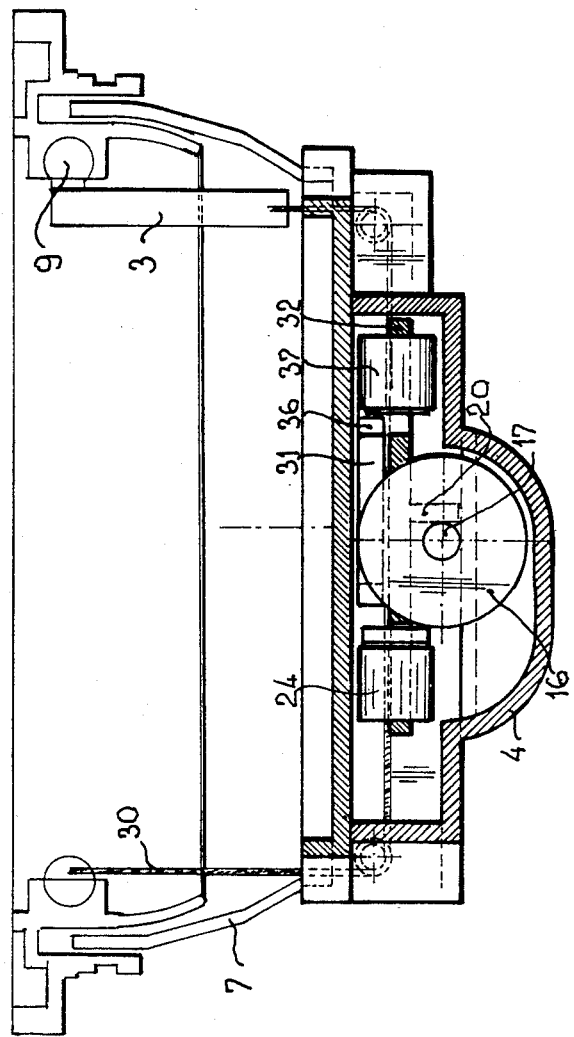
Figure 10:
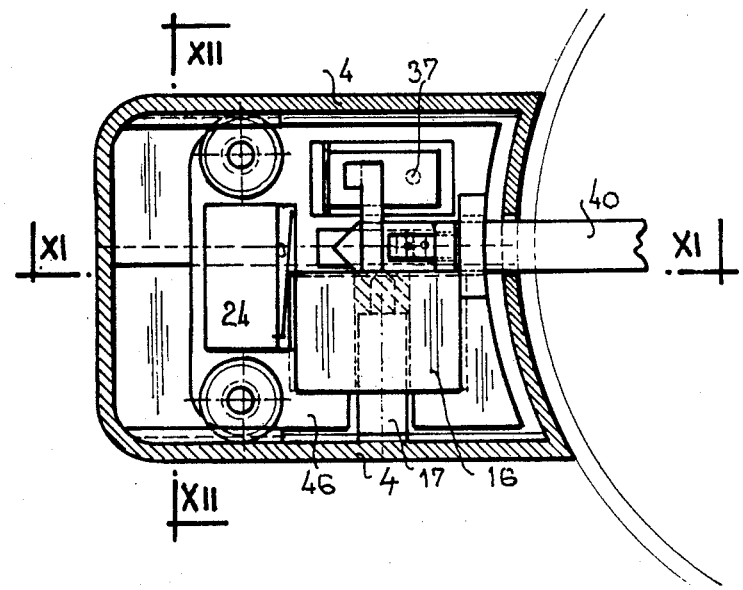
Figure 11:
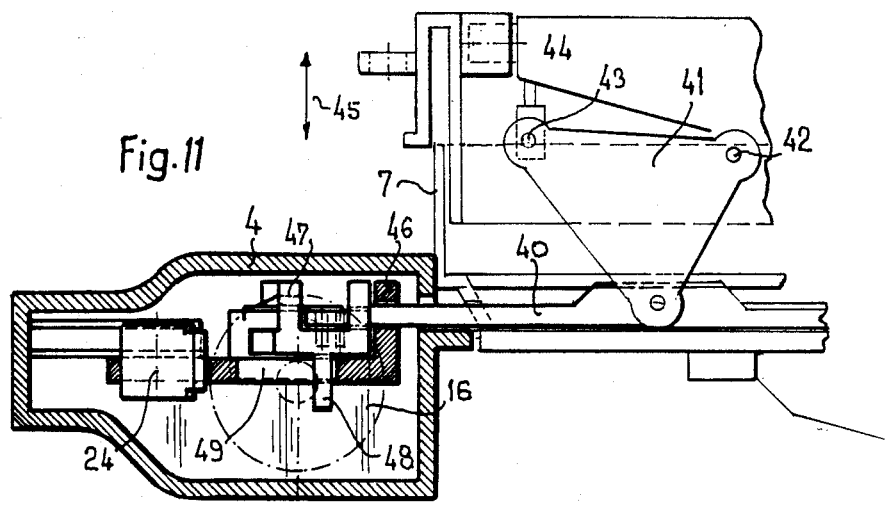
Figure 12:
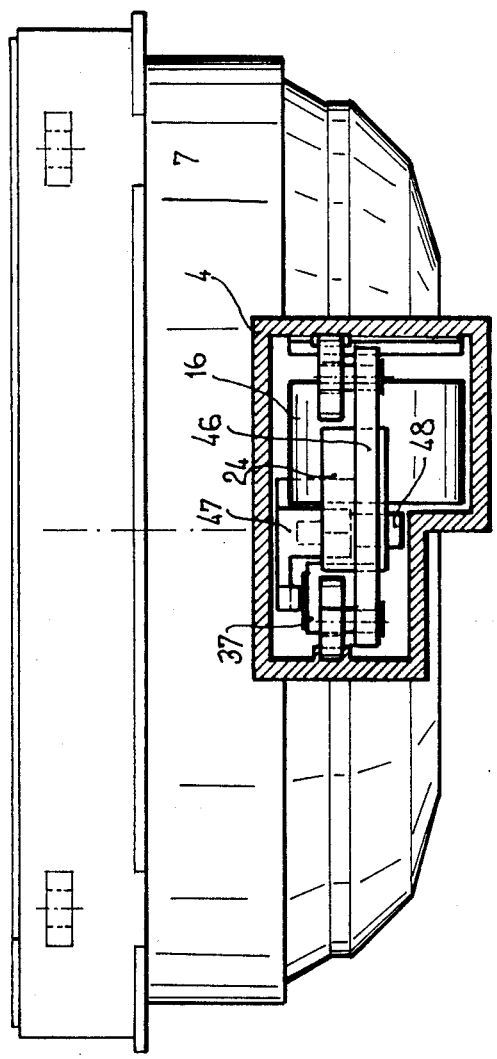
Figure 13:
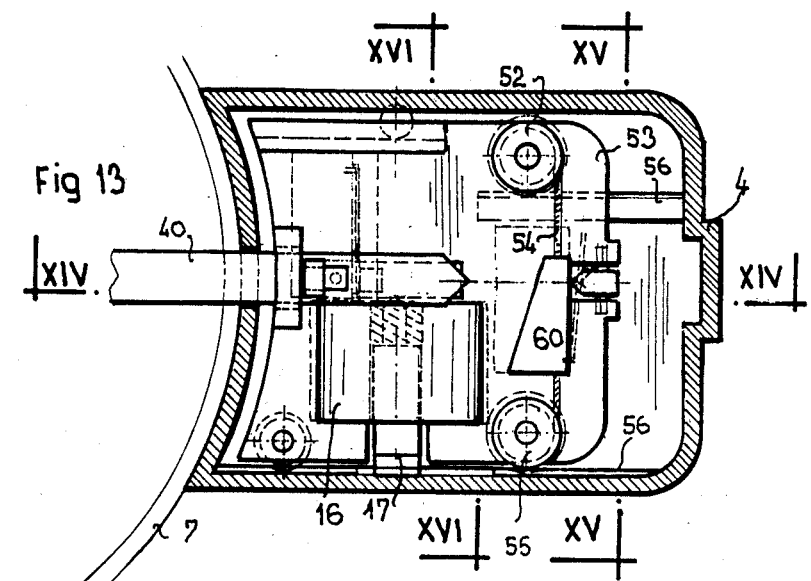
Figure 14:
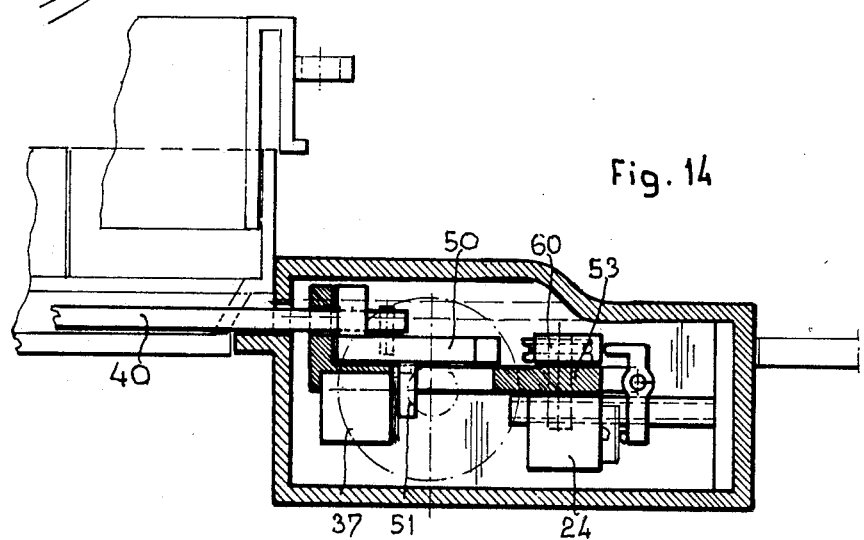
Figure 15:
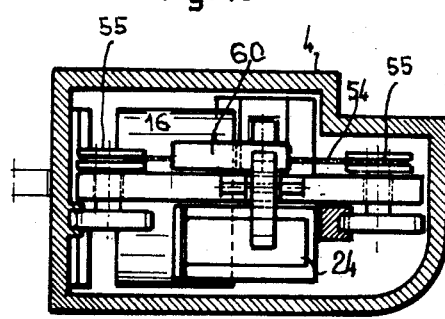
Figure 16:
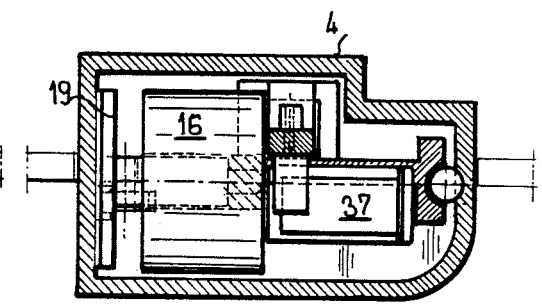
Figure 17:
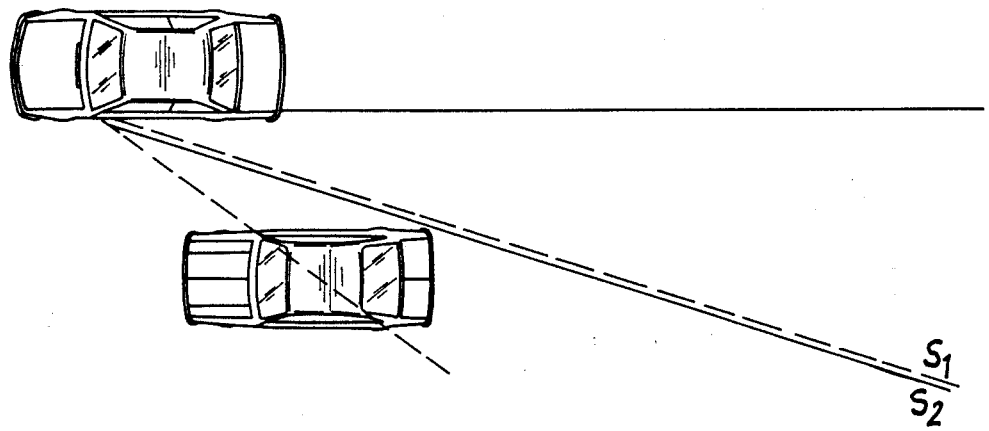

Further details can be seen from the drawings which show:

FIG. 1 is a first embodiment of a left outside mirror according to the invention, seen from above, FIG. 2 is a view of the device according to arrow II in FIG. 1 partly in sectional view, FIG. 3 is a section according to line III—III of FIG. 2, FIG. 4 is a section according to line IV—IV of FIG. 2, FIG. 5 is a section according to line V—V of FIG. 2, FIG. 6 is a view according to the view of FIG. 2 of a second embodiment, FIG. 7 is a section according to line VII—VII of FIG. 6, FIG. 8 is a section according to line VIII—VIII of FIG. 6, FIG. 9 is a section according to line IX—IX of FIG. 6, FIG. 10 is a view according to FIG. 2 of a third embodiment of the invention, FIG. 11 is a section according to line XI—XI of FIG. 10, FIG. 12 is a section according to line XII—XII of FIG. 10, FIG. 13 is a view according to the view of FIG. 2 of a fourth embodiment, FIG. 14 is a section according to line XIV—XIV of FIG. 13, FIG. 15 is a section according to line XV—XV of FIG. 13, FIG. 16 is a section according to line XVI—XVI of FIG. 13, and FIG. 17 is a practical case.

In all the embodiments of the invention the principle is the following: The motor, which turns the mirror slowly around a vertical axis (in order to adapt it to the distance of the driver's eyes from the mirror), is at the same time used for fast shifting movement of the mirror to check the blind spot, this being effected in that for the fast shifting the motor receives a higher voltage. In the supplemental device there is a first element, which oscillates (slow or fast) together with the mirror at the swivelling of the latter. This first element actuates a switch at the limit of its movement in either direction, whereby with these switches the limit of movement of the mirror is defined. The two switches are located on a second element, which is coupled with the first element during the slow swivelling of the mirror and the corresponding slow movement of the first element, and thus moves with the first element and the mirror. When the mirror is rapidly shifted the connection between the first and second element is disconnected and at the same time the second element is locked relative to the housing of the supplemental device. In the case of the right outside mirror in principle the desired result is achieved. In the case of the left outside mirror one must keep in mind that the blind spot location of the mirror depends on the distance of the driver's eyes from the mirror (with the right outside mirror this dependency is neglectably small.) In order to take this dependency into account, the position of the actuating member for the switch that corresponds to the blind spot location must be altered in dependency of the movements of the second element relative to the first element. For the realization of this object there are various possibilities: In the present cases the problem is solved in that a wedge is oscillated back and forth upon movement of the second element perpendicular to the direction of movement of the second element. Finally, a third element is provided that connects the mirror, or an element connected with the mirror, and the first and second elements in the supplemental device. The third and first elements in one embodiment, however, are identical in the present cases.

FIGS. 1 to 5 show a first embodiment. In this embodiment the third element, i.e. the element which makes the connection between the mirror and the elements in the supplemental device, is a rack, which at one end is connected with the mirror and at the other end projects into the supplemental device. One can learn this from FIG. 1, in which the mirror is designated at 1 and a mirror housing at 2 and in which the rack comprising the third element is designated at 3. To the supplemental device the reference numeral 4 is attributed. The first element is a rack 5 (see. FIG. 2) which is actuated with a rack drive by rack 3. The second element is a frame 6.

In detail the situation is the following: Mirror 1 is swivelled by motors (not illustrated) that are located within a frame 7 (see FIG. 1). This frame 7 is connected to housing 2 by elements 8. In addition, at frame 7 opposite mirror 1 the supplemental device 4 is located. The previously mentioned rack 3 at one end is operated by the motor (not illustrated) for the swivelling of the mirror around a vertical axis and is connected to mirror 1 at point 9. At the other end, rack 3 projects into the supplemental device 4 (see FIG. 2). In the supplemental device 4 the rack 3 operates rack drive 10 comprising a gear wheel 11 and a gear wheel 13 located on the opposite end of shaft 12. Elements 3, 10, 11, 12, 13 together form the third element.

The first element comprises rack 5. This engages a pinion 14, which engages gear wheel 13.

The previously mentioned frame 6 (comprising the second element) is supported in the supplemental device 4 for reciprocal movement in the direction of the longitudinal axis of rack 5 on rails 15. This frame 6 can be locked with rack 5 by way of an electro-magnet 16 located on frame 6. Its armature 17 is pressed by a spring away from rack 5 and against the wall of the supplemental device 4. In the position as shown in FIG. 2 the anchor presses against the housing of the supplemental device 4 under the bias of spring 18. This armature 17 shows at its end facing the housing a base 19 which is in a friction or ratchet connection with the wall of the housing of the supplemental device 4. Armature 17 thus keeps the frame 6 absolutely tight with respect to the housing of the supplemental device 4.

When the electro-magnet 16 is actuated, the armature is moved against the force of spring 18, with respect to FIG. 2, diagonally upward and to the left, which leads to a coupling of rack 5 with frame 6 and a disconnection of the connection of base 19 with the housing 4. When rack 5 now moves, frame 6 also moves. The locking between armature 17 and rack 5 is effected by way of shoulder 20 at rack 5 (see FIG. 2). When the rack 5 moves with respect to FIG. 2 diagonally downwardly and towards the left, it takes along frame 6 with shoulder 20 and armature 17. When rack 5 moves in the opposite direction, shoulder 20 pushes with respect to FIG. 3 onto the right edge of an opening 25 in frame 6.

Frame 6 supports a wedge 21. This is reciprocally movable transversely to the direction of motion of the frame. It is connected to a cord 22. This cord runs over rolls 23. The latter are located on shafts that bear gear wheel meshing with racks 26. During the reciprocal movement of frame 6 wedge 21 is also moved reciprocally.

During slow shifting of the mirror, frame 6 moves simultaneously therewith. During fast shifting of the mirror, during which armature 17 is not connected to rack 5 but holds frame 6 over base 19, frame 6 does not move. During fast shifting of the mirror into the blind spot position, rack 5 moves downward to the left (as per FIG. 2) and finally pushes with its point against wedge 21. This actuates a switch 24 with the result that the mirror runs back into its starting position. The transverse shifting of wedge 21 effects a change in the blind spot position of the mirror with respect to its basic position in dependency from the distance of the driver's eyes from the mirror.

FIGS. 6 to 9 show a second embodiment. In this embodiment the third element, i.e. the element which connects the mirror and the first and second elements in the supplemental device, is a cord 30 which is connected at its two ends with the mirror and runs through the supplemental device 4. The first element is a pin 31 connected with the cord, which element is reciprocated by the cord. The second element is a frame 32.

The details are as follows: The embodiment according to FIGS. 6 to 9 corresponds largely to the representation according to FIG. 1. The rack 3 shown in FIGS. 1 to 5, however, ends in FIGS. 6 to 9 outside of the supplemental device 4 (see FIG. 8). Cord 30 is connected with its one end with this rack 3 and runs over rolls 33.

Frame 32 is reciprocally movable in the supplemental device in the direction of the longitudinal axis of pin 31 on guide rails 34. Frame 32 can be locked with pin 31 and can be separated from the latter by way of an electromagnet 16 which is located at the plate. Its armature 17 is pressed by spring 18 to the right as per FIG. 8. Armature 17 shows at its right end (see as per FIG. 8) a base 19 which, as long as the electro-magnet is not under current, presses against a wall of the supplemental device 4 in such a way that frame 32 is firmly anchored with respect to the supplemental device 4. When pin 31 (without taking along frame 32) reciprocates, it contacts actuating member 35 of a switch 24 at one end of its range of movement and an actuating member 36 of a switch 37 at the other end. By means of switches 24 and 37 the swivelling movement of the mirror is defined.

If electro-magnetic 16 is put under current, armature 17 moves upwards relative to FIG. 6 and to the left relative to FIG. 8. This entails a locking between the armature and thus the frame 32 and pin 31. This locking is possible due to the fact that pin 31 has a shoulder 20 at its lower end which enters into an effective connection with armature 17 if pin 31 moves to the left with respect to FIG. 6. The taking along of frame 32 to the right is effected in that pin 31 moves towards the right edge of shoulder 38 in frame 32 with respect to the FIG. 7.

The embodiment according to FIGS. 6 to 9 is of such kind that stop 35 for pin 31 is unchanged in all positions of frame 32. This embodiment thus is not applicable for the left but only for the right outside mirror. It is of course possible to provide in this embodiment structure corresponding to wedge 21 and the associated apparatus of FIGS. 2 to 5 that moves wedge 21 to provide a stop which changes in dependency of the position of frame 32 in the supplemental device 4.

In this embodiment it is also the fact that during slow shifting of the mirror around its vertical axis, frame 32 is locked to and moved with pin 31 and during fast shifting it remains stationary.

FIGS. 10 to 12 show a third embodiment. This differs from the two previously described embodiments insofar as the supplemental device 4 is not fastened to frame 7 opposite mirror 1, but laterally on frame 7. This embodiment takes into account a somewhat different construction of the mirror for slow shifting. A rod 40 (see FIG. 11) is oscillated by a motor (not shown). Rod 40 is pivotally fastened to triangle 41 having a pivot at 42 which is fixed with respect to frame 7. Further, a rod 43 acts on triangle 41 to effect the slow swivelling movement of the not illustrated mirror. (The mirror is fastened on an element 44 such that the lateral oscillation of rod 40 oscillates element 44 vertically (see arrow 45.)

In this embodiment, rod 40 is extended to the left with respect to FIG. 11 and into the supplemental device 4. Rod 40 thus is the third element. The second element again is a frame 46. The first element is the end of rod 40 located in the supplemental device 4 and a further element which is discussed below.

The details are as follows: At the end of rod 40 located in the supplemental device 4, an element 47 is fastened thereto having a shoulder 48 at the bottom. This shoulder projects into an opening 49 of frame 46. As in the previous embodiments, frame 46 again supports an electromagnet 16 with armature 17. When this electro-magnet 16 is put under current, armature 17 moves upwards with respect to FIG. 10. At the movement of rod 40 to the left with respect to FIG. 11, with respect to FIG. 11 and moves frame 46 to the right. The supplemental device 4 has two switches 24 and 37 which are actuated by element 47 to effect the reversal of current and corresponding reversal of the mirror direction of travel.

FIGS. 13 to 16 show a fourth embodiment. This corresponds to the embodiment according to FIGS. 10 to 12 with the following differences: Supplemental device 4 is located on the other side of frame 7. (The mirror without supplemental device is the same as the mirror without supplemental device as per the embodiment according to FIGS. 10 to 12.) Also, (accordingly) rod 40 is also extended to the other side. Finally, this embodiment has a wedge 60 which can be shifted transversely, so that it can be used for the right outside mirror.

The details are as follows: At the end of rod 40 located in the supplemental device 4, an element 50 is provided. This has a shoulder 51 extending downwards.

The latter co-operates with the armature 17 of electromagnet 16 when armature 17 is in its upper position with respect to FIG. 13, and with the left edge of an opening 52 in frame 53 as per FIG. 14. Thus, as rod 40 oscillates back and forth, frame 53 is moved therewith. Frame 53 supports, as previously mentioned, a wedge 60 movable transversely to the direction of motion of frame 53. This is effected via a cord 54 which runs over rolls 55. The latter are coupled with gear wheels which mesh with racks 56. During the back and forth oscillating movement of frame 53, oscillation of the wedge 60 transversely to the movement of the frame is effected.

The present invention, as in the invention of the main application and the copending continuation application, is of special interest in the case (see FIG. 17) that in the blind spot position of the mirror ray $S_1$ which faces the vehicle after the shifting of the mirror (approximately) coincides with or is parallel to ray $S_2$ that faces away from the vehicle before shifting. (In this case no new blind spot is originating between the two angle scopes.)

I claim:

1. Device for an outside mirror for motor vehicles which is electrically slowly shiftable around a vertical axis, and which is electrically rapidly shiftable by switch means for temporarily viewing a blind spot, comprising:

a supplemental device (4) comprising a first element (5;31;47;50) which, upon actuation of the switch, oscillates between two limit points whereby at the actuation of the switch a synchronous fast shifting of the mirror (1) around the vertical axis is effected, and a second element (6;32;46;53) running synchronously with the slow shifting of the mirror (1) around the vertical axis for adjusting the mirror to the distance of the driver's eyes from said mirror (1), whereby the second element (6;32;46;53) fixes one of said limit points which corresponds to the position of said mirror (1), into which this is swivelled for covering the blind spot, and whereby the supplemental device (4) is mounted directly behind said mirror in the mirror housing (2) and firmly connected thereto, and whereby into the supplemental device (4) a third element (3;30;40) is extending establishing a connection between said mirror (1) and said first (5;31;47;50) element and said second (6;32;46;53) element.

2. Device according to claim 1, characterized in that said third element comprises a first rack (3) with one end fastened to said mirror (1) and with its other end projecting into the supplemental device (4), a rack drive (10) meshing with the first rack (3), said first element comprising a second rack (5) the longitudinal axis of which runs substantially perpendicular to the longitudinal axis of the first rack (3), and which also meshes with the rack drive (10).

3. Device according to claim 1, characterized in that said third element comprises a cord (30) which is fastened at its ends to said mirror (1) and which is guided through said supplemental device (4) over roller means (33), and said first element comprises pin means (31) the longitudinal axis of which runs substantially parallel to said mirror (1) and which is connected to said cord (30).

4. Device according to claim 1, characterized in that said third element comprises a third rod (40) which is fastened at one end to a triangular element (41), for moving said mirror (1), and which projects with its other end into the supplemental device (4), and said first element comprises an end portion of said third rod (40).

5. Device according to claim 1, characterized in that said supplemental device (4) is fastened to a frame (7) carrying motors for swivelling the mirror (1).

6. Device according to claim 5, characterized in that the supplemental device (4) is fastened to the frame (7) opposite the mirror (1).

7. Device according to claim 5, characterized in that the supplemental device (4) is fastened to the frame (7) laterally thereof.

8. Device according to claim 1, characterized in that said second element comprises a second frame (6;32;46;53) movable in an oscillating manner within said supplemental device (4) and which releasably engages said first element (5;31;40), whereby the second frame during the slow swivelling of said mirror (1) around the vertical axis is engaged with said first element (40;47;40;50) and during the fast swivelling of mirror (1) is disengaged from said first element and is fixed with respect to the housing of the supplement device (4).

9. Device according to claim 8, characterized in that said second frame carries an electro-magnet (16) whose armature (17) is anchored in a first position with a portion of said first element, and in a second position with the housing of the supplemental device (4).

10. Device according to claim 1, characterized in that the second element (6;53) carries a fourth element (21;60) forming a limit point and which fourth element shifts synchronously with the oscillating movements of said second element in a way that the blind spot position of mirror (1) is adjusted to the distance of the eyes of the driver from said mirror in which position a ray ($S_1$) facing the vehicle substantially coincides with a ray ($S_2$) facing away from the vehicle or is substantially parallel with said latter ray (S) before the quick swivelling of mirror (1).

11. Device according to claim 10, characterized in that the second frame carries a wedge (21;60) forming said limit point, which wedge is shiftable back and forth across the direction of motion of said second frame and against which said first element pushes during its forward movement and from which said first element disengages said forward movement.

12. Device according to claim 11, characterized in that said wedge (21;60) is connected to a cord (22;54) which runs over roller means (23;52) which are rotated by cogwheels and racks (26;56) at the movement of said second frame.

13. Device according to claim 1, characterized in that the one limit point is located between said first element (5;31;48;510) and said second element (6;32;46;53).

14. Device according to claim 13, characterized in that said second frame (6;32;46;53) has an opening formed therein (25;38;49;52), the edge of which facing said third element forms the other limit point.

15. Device according to claim 1, characterized in that during fast adjustment of the mirror, the motor for the slow adjustment of the mirror around the vertical axis is supplied with a voltage higher than the voltage for the slow adjustment.

16. Apparatus for an outside mirror for motor vehicles which is electrically slowly shiftable to adjust the mirror to an individual driver, and rapidly shiftable by switch means from the driver-adjusted position to a temporary blind-spot viewing position, comprising:

a supplemental device mounted adjacent said mirror having a first element mounted therein for oscillating movement with said mirror between two limit points defining the limit of movement of said mirror, a second element releasably connected to said first element by locking means during the slow shifting of said mirror, said second element supporting a limit switch actuating element defining one of said limit points, a limit switch mounted in said supplemental device adjacent said limit switch actuating element and connected to drive means for said mirror to stop or reverse the movement of said mirror when said actuating element is contacted by said first element, said actuating element movably mounted on said second element for movement in response to the motion of said second element connected to said first element to alter the limit point defined thereby, and a third element extending from said mirror into said supplemental device, said third element engaging said first element at one end and said mirror at the other end.

* * * * *